April 25, 1961   J. A. ARMSTRONG ET AL   2,981,141
OPTICAL COMPENSATOR AND TILT DETECTOR
Filed Jan. 16, 1958                    2 Sheets-Sheet 2
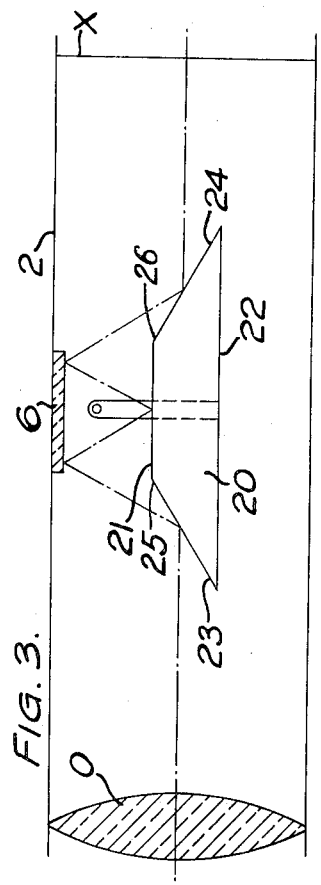
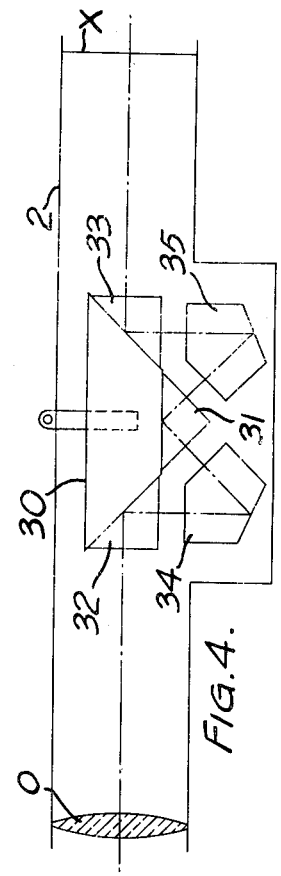
Inventors:
John Argent Armstrong
and
Douglas William Berry
By their attorneys:
Baldwin & Wight United States Patent Office 2,981,141
Patented Apr. 25, 1961

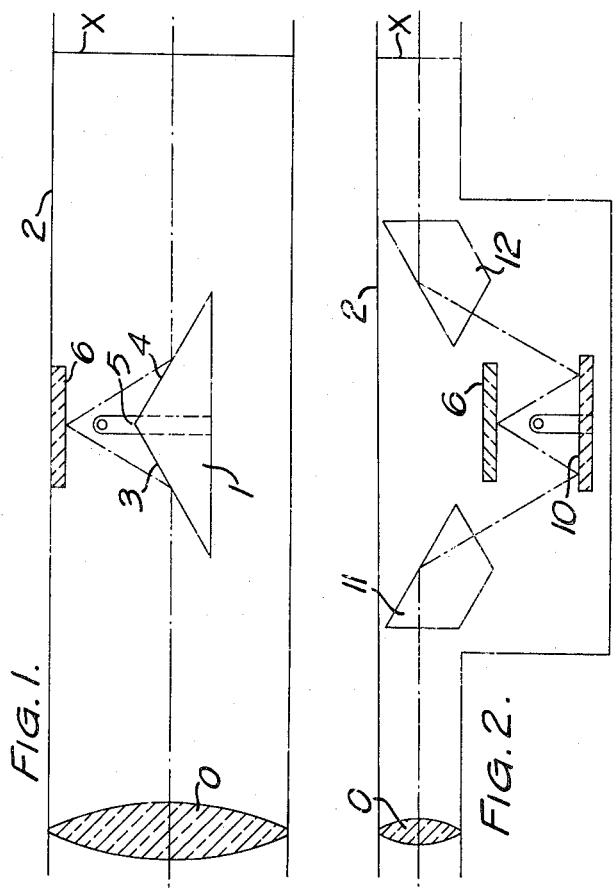

2,981,141

OPTICAL COMPENSATOR AND TILT DETECTOR

John Argent Armstrong, Wembley Park, and Douglas William Berry, Grove Park, London, England, assignors to Hilger & Watts Limited, London, England, a corporation of the United Kingdom Filed Jan. 16, 1958, Ser. No. 709,263

Claims priority, application Great Britain Jan. 16, 1957

15 Claims. (Cl. 88—1)

This invention relates to tilt detection and optical compensation, and in particular to a device which may be used for the detection of small angles of tilt of a body from the horizontal, vertical, or any given intermediate inclination in instruments such as telescopes, levels, optical plummets, and the like.

For example, optical instruments used in surveying and engineering, often employ a telescope of which the line of sight is required to be level when observations are taken. Heretofore it has been customary for the telescope body to be set up truly horizontal in order to ensure that the optical axis of the instrument is also horizontal, and the operations necessary to do this are both tedious and time wasting. Furthermore, when, as is usually the case, a bubble is used to obtain the level inaccuracies occur due to the sensitivity of the bubble to changes of temperature, such as may occur from the effects of direct sun-light or cold draughts.

As an alternative to levelling the body of the telescope, optical compensation can be obtained for small angles of tilt by arranging a reflecting surface, such as a mirror or prism inside the body of the telescope so that rays of light from an object towards which the telescope is pointed, are always coincident with the intersection of the cross lines of the telescope graticule even when the geometric axis of the telescope is inclined. It is essential for this purpose that the mirror or prism should be tilted through an angle proportional to the angle of tilt of the telescope body, the ratio between the two angles being dependent upon the distance of the mirror from the telescope graticule. The more closely the compensating mirror is placed to the graticule the greater must be the angle through which the ray reflected from the mirror must be turned and consequently the greater must be the angle through which the mirror must be turned. As in most instruments the focusing lenses are disposed within the telescope body between the objective lenses and the compensator and extend for a proportion of the length of the body, it is necessary for the compensator to be located as close as possible to the graticule.

It is the object of the present invention to provide a tilt detection and optical compensating device which will enable the ray issuing from the reflecting surface to be turned through an angle considerably greater than the angle of tilt of the instrument and which will avoid the necessity of allowing the mirror to be turned through an angle greater than that of the tilt of the instrument.

It is a further object of the invention to provide a compensator which is applicable to a variety of optical instruments utilising the optical principles of the telescope or microscope which can be produced at a reasonable cost, which will be accurate over small angles of tilt and which will not easily be damaged or deranged in use.

In accordance with the present invention a tilt detector or optical compensator for an instrument comprises a reflecting unit component suspended within the body of the instrument so as to maintain a substantially constant spacial orientation and comprising one or more reflecting surfaces, and a reflecting means component secured to the instrument body so as to move therewith when the instrument is tilted and comprising one or more reflecting surfaces, the reflecting unit component and the reflecting means component being so disposed relative to each other and the path of light through the instrument that an incoming ray of light incident upon the reflecting means component or the reflecting unit component is subjected to a sequence of reflections between the two units whereby the ray emergent after the last reflection from the reflecting unit component or the reflecting means component is turned through an angle, which is an even integral multiple, greater than two, of the angle at which the instrument body is tilted.

It should be understood of course that where the reflecting unit or the reflecting means comprises more than one reflecting surface, the said surfaces of the reflecting unit or the reflecting means are fixed relative to each other.

In such an arrangement of fixed and movable reflections when the suspended surface, or plurality of suspended surfaces, is angularly moved relative to the fixed surface, or surfaces, for a given incident beam, the beam reflected from the suspended surface or surfaces will be turned through an angle which is a multiple (depending upon the number of reflections) of the said relative angle of movement thus producing an optical magnification. The reflected beam may be used to indicate the tilt of the instrument body to which the fixed reflecting surface is secured, or alternatively the arrangement may be so positioned within the telescope body of a viewing instrument that the reflected beam from a horizontal incident beam is always brought into co-incidence with an eye piece graticule so as to produce optical compensation for tilt.

The invention further includes a viewing instrument provided with such a compensator wherein the ray emerging from the objective and focusing lenses constitutes the ray incident upon the first-mentioned reflecting surface of the compensator and the ray finally reflected from one of the suspended reflecting surfaces is directed onto the graticule of the instrument.

The reflecting surfaces may be constituted by plane mirrors or prism faces.

In order that the invention may be more clearly understood examples of optical compensators for a surveyor's level or other optical viewing instrument in accordance with the invention will now be more particularly described with reference to the accompanying diagrammatic drawings.

In the drawings:

Figure 1 is a diagrammatic longitudinal section of a viewing instrument provided with one form of optical tilt compensator device, some parts being shown in elevation; and Figures 2, 3 and 4 are views similar to Figure 1 but showing respectively three other embodiments of the invention.

In a first embodiment shown in Figure 1, a triangular section prism 1 is freely suspended within the body 2 of a telescope so that two adjacent plane surfaces 3 and 4 are upwardly directed. In this, as in the other figures, only those parts of the instrument essential to an understanding of the invention have been indicated. The meeting edge 5 of the two surfaces of the suspended prism is at right-angles to the optical axis of the instrument and the surfaces or faces 3 and 4 are equally inclined to the vertical and at such an angle that rays of light close to the horizontal are reflected upwardly onto the plane reflecting surface 6 of a reflecting means component constituted by a mirror or prism fixed within the body of the telescope above the prism. When the telescope is horizontal a horizontal ray of light from the objective O incident upon one of the prism faces 3 is reflected onto the plane fixed reflector 6 and then back onto the second face 4 of the prism from whence it is again reflected in a horizontal direction to the graticule cross wires X of the telescope. When the instrument is tilted through a small angle, e.g. $\phi$, the suspended prism will rotate through an equal angle $\phi$ relative to the optical axis of the instrument so as to remain horizontal. In consequence a ray of light reflected from the first mentioned surface 3 of the prism will be rotated through an angle $2\phi$ relative to its original direction and the ray directed towards the graticule from the second surface 4 of the prism will be rotated through an angle of $4\phi$ relative to its original direction. The arrangement will give a magnification of 4:1. In consequence if the compensator is located at a distance from the telescope graticule equal to a quarter the equivalent focal length of the objective and focusing lenses combined, a ray of light from an object horizontally in front of the instrument will be maintained at the intersection of the graticule cross wires through all small angles of tilt of the instrument.

In a further embodiment (Figure 2) in which a similar magnification of 4:1 is obtained the suspended prism is replaced by a mirror 10, the surface of which is disposed truly horizontal. The incident ray from the objective is directed onto the surface of the suspended mirror by a prism 11, and after the second reflection from the suspended mirror is directed towards the eye piece by a second prism 12. These prisms 11 and 12 do not enter into the compensation and are merely used to change the direction of the axis of light through the telescope so that the incoming light may be reflected from the suspended mirror and the reflected light will be directed to enter the eye piece.

In a third embodiment (Figure 3) the compensator provides a magnification of 6:1 and the incident ray is reflected three times from suspended reflecting surfaces. In accordance with this embodiment a prism 20 of regular trapezoidal section is freely suspended within the instrument, the upper 21 and lower 22 faces being thereby maintained horizontal and the side faces 23, 24 being equally inclined thereto. The edges 25, 26 formed by the upper face and side faces are at right-angles to the axis of the telescope. Incident light from the objective is reflected from the side face 23 of the prism nearest to it and onto a reflecting surface 6 fixed to the telescope body and disposed opposite to and above the prism. The ray is then reflected from the fixed surface onto the upper horizontal surface 21 of the prism back again to the fixed reflecting surface and then onto the second side surface 24 of the prism from which it is reflected to the eye piece. In each of the embodiments the fixed reflecting surface which directs the ray back onto the suspended reflecting surface or surfaces may be constituted by a plane mirror or the surface of the prism. Where it is necessary to rectify transposition of left to right in the image in the eye piece, this prism may be of the so-called "roof" type.

In a further embodiment shown in Figure 4, the compensator comprises a mounting 30 freely suspended within the telescope body of the level and carrying three prisms 31, 32, 33 having plane reflecting surfaces adjacent the body and arranged so that two of the prisms 32, 33 reflect horizontal light incident upon them vertically downwardly. The third prism 31 is arranged so that its reflecting surface is horizontal and is disposed intermediate of the first-mentioned prisms along the line of sight of the telescope.

Secured to the instrument body substantially below the mounting are two further prisms 34, 35 having plane reflecting surfaces. These two prisms are rigidly fixed to the telescope body 2 so that they move with it. Horizontal rays of light from the telescope objective O incident upon one of the two first-mentioned prisms (i.e. prism 32) secured to the mounting are reflected downwardly onto one of the reflecting prisms (i.e. prism 34) fixed to the instrument body and back onto the horizontal reflecting surface of the third prism 31 secured to the mounting 30, from whence it is again reflected onto the reflecting surface of the second prism 35 fixed to the instrument body. The second fixed prism reflects the light upwardly once more onto the surface of the second (33) of the two first-mentioned prisms secured to the mounting from whence it is reflected in the graticule of the telescope.

If the instrument body is rotated about a horizontal axis at right-angles to the line of sight, a ray of light directed towards the eye piece will turn through an angle which is six times that through which the instrument itself has turned due to the multiple reflections through the prisms constituting the compensator. The compensator is located in a position such that its distance from the graticule upon which the objective is focussed is one sixth of the distance from the graticule to the optical centre of the objective and the fixed prisms are so orientated that when the telescope is truly horizontal a horizontal ray from the objective passes through the centre of the graticule. When the telescope is tilted through a small angle, say $\alpha$, the ray from the objective directed onto the eye piece is turned through an angle of $6\alpha$ thus maintaining horizontal rays of light from an object in the field view of the telescope in focus on the graticule.

In order to compensate for image inversion caused by the optical system one of the prisms may if desired be a roof prism. Moreover, it is to be understood that the reflecting surfaces may be provided by plane mirrors or other suitable reflectors in place of the prisms described above.

Where a compensator such as any of those particularly described above is to be used to determine tilt, the angle through which the emergent ray turns when the body to which the compensator is applied is tilted will indicate the angle of tilt magnified a number of times determined by the number of reflections from the suspended surfaces.

What is claimed is:

1. A device for providing optical compensation for tilt of a viewing instrument comprising a reflecting unit component suspended pendulously within the body of the instrument and having at least one reflecting surface, and a reflecting means component secured to the instrument body so as to move therewith when the instrument is tilted and having at least one reflecting surface, there being at least three of said reflecting surfaces provided by said reflecting unit component and said reflecting means component considered together, a reflecting surface of one of said components being disposed in the path of light through the instrument, the reflecting unit component and the reflecting means component being so disposed relative to each other and the path of light through the instrument that an incoming ray of light incident upon said one of said components is subjected to a sequence of reflections between the reflecting surfaces of said components whereby the ray emergent after the reflection from the last of said reflecting surfaces upon which the ray is incident is turned through an angle which is an even integral multiple, greater than two, of the angle at which the instrument body is tilted.

2. A device according to claim 1 wherein at least some of the reflecting surfaces are constituted by plane mirrors.

3. A device according to claim 1 wherein at least some of the reflecting surfaces are constituted by prism faces.

4. A device according to claim 3 wherein one of the prisms is a roof prism.

5. A device according to claim 1 wherein the number of reflections between the reflecting unit component and the reflecting means component is such that the emergent ray is turned through an angle which is four times the angle through which the instrument body is tilted.

6. A device according to claim 1 wherein the reflecting unit component and the reflecting means component each contain one reflecting surface.

7. A device according to claim 1 wherein the reflecting unit component contains two reflecting surfaces equally inclined to the optical axis of the instrument and the reflecting means component comprises a single reflecting surface arranged parallel to said optical axis.

8. A device according to claim 1 wherein the reflecting unit component contains three reflecting surfaces, two of said surfaces being equally inclined to the optical axis of the instrument and the third reflecting surface being parallel to said optical axis, and the reflecting means component comprises a single reflecting surface parallel to the third reflecting surface of the reflecting unit component.

9. A device according to claim 1 wherein the reflecting unit component contains two reflecting surfaces equally inclined to the optical axis of the instrument and a third reflecting surface parallel to said axis, and the reflecting means component contains two reflecting surfaces.

10. An optical viewing instrument including an objective and a graticule, and comprising a device for providing optical compensation for tilt which comprises a reflecting unit component suspended pendulously within the body of the instrument and having at least one reflecting surface, and a reflecting means component secured to the instrument body so as to move therewith when the instrument is tilted and having at least one reflecting surface, there being at least three of said reflecting surfaces provided by said reflecting unit component and said reflecting means component considered together, a reflecting surface of one of said components being disposed in the path of light through the instrument, the reflecting unit component and the reflecting means component being so disposed relative to each other and the path of light through the instrument that an incoming ray of light incident upon said one of said components is subjected to a sequence of reflections between the reflecting surfaces of said components whereby the ray emergent after the reflection from the last of said reflecting surfaces upon which the ray is incident is turned through an angle which is an even integral multiple, greater than two, of the angle at which the instrument body is tilted.

11. An optical viewing instrument according to claim 10 wherein the reflecting unit component and the reflecting means component each contains one reflecting surface.

12. An optical viewing instrument according to claim 10 wherein the reflecting unit component contains two reflecting surfaces equally inclined to the optical axis of the instrument and the reflecting means component comprises a single reflecting surface arranged parallel to said optical axis.

13. An optical viewing instrument according to claim 10 wherein the reflecting unit component contains three reflecting surfaces, two of said surfaces being equally inclined to the optical axis of the instrument and the third reflecting surface being parallel to said optical axis, and the reflecting means component comprises a single reflecting surface parallel to the third reflecting surface of the reflecting unit component.

14. An optical viewing instrument according to claim 10 wherein the reflecting unit component contains two reflecting surfaces equally inclined to the optical axis of the instrument and a third reflecting surface parallel to said axis, and the reflecting means component contains two reflecting surfaces.

15. A device according to claim 1 wherein the number of reflections between the reflecting unit component and the reflecting means component is such that the emergent ray is turned through an angle which is six times the angle through which the instrument body is tilted.

References Cited in the file of this patent

UNITED STATES PATENTS

| | | |
|---|---|---|
| 994,061 | Cordeiro et al. | May 30, 1911 |
| 1,552,449 | Roach | Sept. 8, 1925 |
| 1,722,209 | Gordon | July 23, 1929 |
| 2,386,621 | Luboschez | Oct. 9, 1945 |
| 2,406,798 | Burroughs | Sept. 3, 1946 |
| 2,410,667 | Luboshez | Nov. 5, 1946 |
| 2,533,686 | Peterson | Dec. 12, 1950 |
| 2,741,940 | Drodofsky | Apr. 17, 1956 |
| 2,779,231 | Drodofsky | Jan. 29, 1957 |
| 2,843,001 | Werner | July 15, 1958 |
| 2,855,818 | Wehling | Oct. 14, 1958 |

FOREIGN PATENTS

| | | |
|---|---|---|
| 346,908 | Germany | Jan. 9, 1922 |
| 548,685 | Germany | Apr. 16, 1932 |
| 550,075 | Germany | May 13, 1932 |
| 178,209 | Austria | Apr. 26, 1954 |